United States Patent [19]

Gathright et al.

[11] 3,829,671

[45] Aug. 13, 1974

[54] METHOD AND CIRCUIT FOR CALCULATING THE SQUARE ROOT OF THE SUM OF TWO SQUARES

[75] Inventors: Jack G. Gathright, Glen Burnie; Richard E. Park, Laurel, both of Md.

[73] Assignee: Westinghouse Electric Corporation, Pittsburgh, Pa.

[22] Filed: Apr. 25, 1973

[21] Appl. No.: 354,621

[52] U.S. Cl. .......... 235/158, 235/151.31

[51] Int. Cl. .......... G06f 7/38

[58] Field of Search .......... 235/151.31, 158

[56] References Cited

UNITED STATES PATENTS 3,505,505 4/1970 Byerly et al .......... 235/151.31

*Primary Examiner*—Malcolm A. Morris
*Assistant Examiner*—R. Stephen Dildine, Jr.
*Attorney, Agent, or Firm*—J. B. Hinson

[57] ABSTRACT

An arithmetic logic circuit for performing an algorithm which approximates the square root of the sum of two squares. A novel hardware arrangement and method are disclosed which employ EXCLUSIVE OR circuits instead of a conventional 2's complement arrangement provided by conventional adder-subtractor circuits. The values to be squared are converted to positive value digital signals, compared, and the control signal from a comparison circuit used to command the full value of the larger digital signal and half the value of the smaller digital signal into an adder circuit which receives a correction signal in the event either of the input digital values is negative. The correction signal may be added to the least significant order of the adder output signal or to the next to least significant order depending upon whether the larger or smaller of the digital signals is negative.

11 Claims, 3 Drawing Figures

METHOD AND CIRCUIT FOR CALCULATING THE SQUARE ROOT OF THE SUM OF TWO SQUARES

BACKGROUND OF THE INVENTION

1. Field of the Invention

This invention relates to a method and apparatus for performing an algorithm which extracts the approximate square root of the sum of two squares. More specifically, the invention relates to a novel hardware arrangement which allows the algorithm to be performed with components which have substantially less cost, use less power, and give greater accuracy than conventional arrangements.

The invention herein described was made in the course of or under a contract or subcontract with the Department of Defense.

2. State of the Prior Art

There are many applications in high speed digital signal processors where it is necessary to extract on a continuous basis the square root of the sum of two squares where the values to be squared are continually changing. These values are often in systems where they may be either negative or positive. Hardware circuits capable of exact extraction of the square root of the sum of two squares are complex and require a large number of components, resulting in considerable cost, a requirement for significant operating power, and a requirement for considerable volume for housing the components.

In the past, engineering compromises have been made to reduce the amount of hardware required for producing approximate square root values. Although these compromises may result in errors up to ten percent or so, this extent of inaccuracy is tolerable in certain systems. However, even compromise circuit designs typically require a significant amount of hardware and are thus not only costly, but also take up valuable space and have particular power requirements, factors especially objectionable in airborne radar systems.

OBJECTS AND SUMMARY OF THE INVENTION

It is accordingly an object of the present invention to provide a novel method and apparatus which requires less power, gives greater accuracy, and can be constructed at less cost than the prior circuits for extracting the square root of the sum of two squares.

Another object of the invention is to provide a novel circuit arrangement and method for producing a digital value that is approximately the square root of the sum of two squares where EXCLUSIVE OR circuits are used as a substitute for conventional adder-subtractor circuits that provide a conventional 2's complement arrangement and to make a correction for negative initial digital signal values in an output adder circuit where the value of the larger digital signal is added to half the value of the smaller digital signal.

Briefly, in accordance with the present invention, the plural bit binary digital signals in two channels, which have values that are to be squared, added, and the square roots extracted, are provided as positive value digital signals through complementing, where necessary, without adding a logical 1 in the least significant order, and the positive value signals are compared. The output of the comparison circuit is then used to command the full value of the larger signal as one input to the adder circuit and a half value of the smaller signal as the other input to the adder circuit. In the event that either of the input signals have a negative value, a logical 1 is added to the least significant bit in the output adder circuit.

These and other objects of the invention will become more fully apparent from the claims, and from the following description.

DETAILED DESCRIPTION

Figure 1:
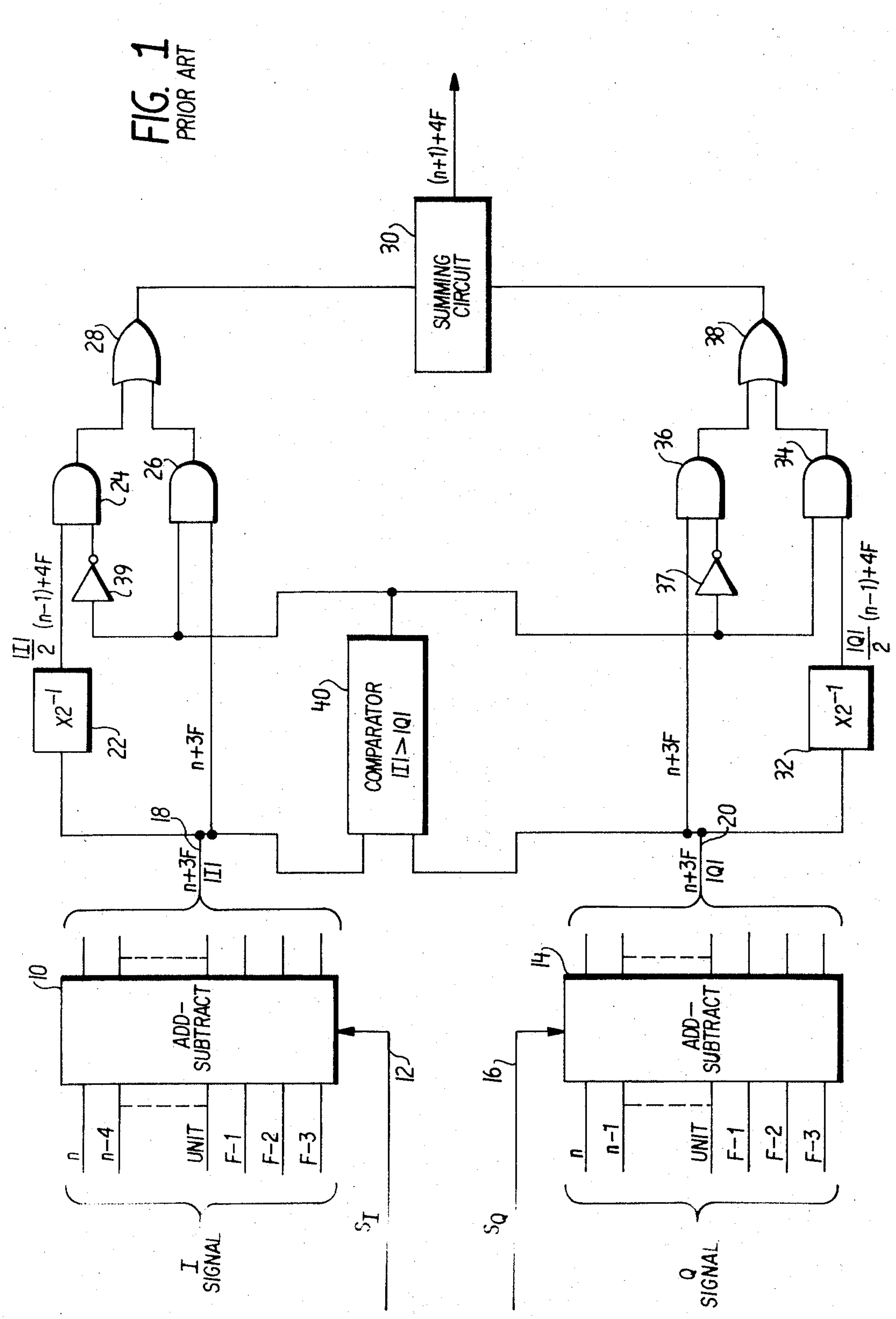
FIG. 1 is a logic diagram of a prior art arrangement for performing an algorithm which approximates the square root of the sum of two squares where the input signal is a plural bit binary digital signal.

Referring now to FIG. 1, there is illustrated a prior circuit which has been used in conjunction with the processing in a radar system of the inphase I signal and the quadrature Q signal. In such systems, it is conventional to perform the extraction of the square root of the sum of the squares of the I and the Q signals. Customarily, the I signal comprises a plural bit binary digital signal which is present on leads which are shown coming into an adder-subtractor circuit 10, together with a sign binary signal $S_I$ on lead 12. A similar Q signal is applied to an adder-subtractor circuit 14 which has its sign signal $S_Q$ on lead 16.

In high speed digital processors, any exact extraction of the square root of the sum of two squares requires considerable hardware. For this reason, the following approximation has often been used:

$$\sqrt{I^2+Q^2} \approx |I| + |Q|/2 \text{ if } |I| > |Q|$$

OR $$\sqrt{I^2+Q^2} \approx |Q| + |I|/2 \text{ if } |Q| > |I|$$

As is apparent to those skilled in the art, the value produced by the algorithm is only an approximation. The absolute value of the signal is added with one-half of the absolute value of the Q signal where the absolute value of the I signal is greater than the absolute value of the Q signal, and in the case where the absolute value of the Q signal is greater than the absolute value of the I signal, the approximate value is obtained by adding the absolute values of one-half the I signal and the full Q signal.

To perform this algorithm, it has in the past been necessary to utilize adder-subtractor circuits 10 and 14 to perform a conventional 2's complement where the magnitudes of the I signal and the Q signal are determined by an examination of the value bits and of the sign bit on leads 12 and 16, respectively. For negative values of an I signal, the signl value $S_I$ on lead 12 is used to control the adder-subtractor circuit 10 to complement the I signal and add to the least significant bit $F_3$ a logical 1. For positive values, the adder, under the control of its mode inputs, passes the I signal unaltered. The sign bit $S_I$ is dropped in both cases. The Q signal is processed in a similar manner to form the $|Q|$ signal.

The output signal $|I|$ from the adder-subtractor circuit 10 on lead 18 comprises n bits plus three fractional bits. A similar output signal | Q | is obtained from the adder-subtractor circuit 14 and is present on lead 20.

The | I | signal on lead 18 is applied to a divide-by-two register 22 which may be of any conventional type. The output signal from the register 22 is, in effect, the input signal shifted by one order to thus provide $(n-1)$ bits plus four fractional bits for application to a logical AND gate 24. The I signal is applied to a logical AND gate 26 and the output signals from the AND gates 24 and 26 are applied to a logical OR gate 28 having its output signal applied to a conventional summing circuit 30.

The | I | and the | Q | signals are also applied to a comparator 40 which produces a logical 1 output when | I | > | Q | and a logical 0 when | Q | > | I |. When | I | > | Q |, the AND gates 26 and 34 are enabled to thereby supply to the summing circuit the unshifted I signal and the shifted | Q | signal. Conversely, when | Q | > | I | the logical 0 output signal from the comparator 40 is inverted by inverters 37 and 39 and gates the unshifted | Q | signal through the AND gate 36 and the shifted | I | signal through the AND gate 24 to be supplied to the summing circuit 30. The output signal from the summing circuit 30 is thus a signal having $(n+1)$ plus 4F bits and which approximates the square root of the sum of the squares of the I and Q signals.

Figure 2:
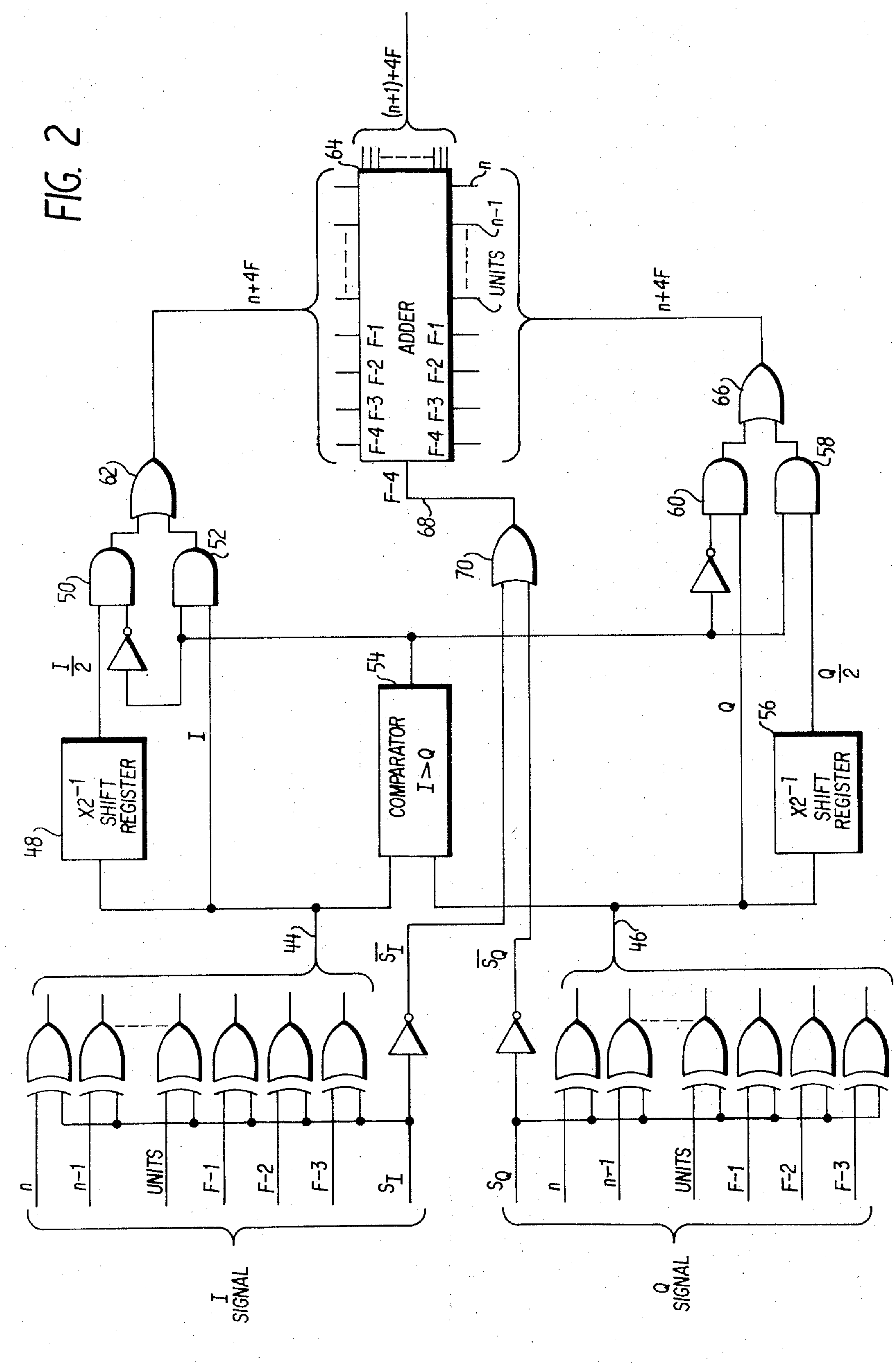
FIG. 2 is a logic diagram of an improved arrangement in accordance with the present invention for performing the same algorithm; and, FIG. 3 is a logic diagram of a further embodiment of the present invention having improved average accuracy as compared with the embodiment of FIG. 2.

Referring now to FIG. 2, the same plural bit binary digital signals are obtained in the I and Q channels, together with a sign bit $S_I$ for the I signal, and a $S_Q$ for the Q signal. In this embodiment, in accordance with one feature of the invention, the adder-subtractor circuits 10 and 14 used in FIG. 1 have been replaced by respective banks of logical EXCLUSIVE OR gates which pass the digital signal without change in the event of a positive sign signal $S_I$ and which complement the digital signal if the sign bit $S_I$ is negative. The truth table for each EXCLUSIVE OR gate may be expressed as follows:

| Sign Bit | Data Input Bit | Output Bit |
|---|---|---|
| 0 | 0 | 0 |
| 1 | 1 | 0 |
| 1 | 0 | 1 |
| 0 | 1 | 1 |

The output signal on lead 44 is thus the same as the I signal in the event of a positive sign and is the complement of the I signal without an added logical 1 in the least significant order if there is a negative sign. A corresponding output signal is provided on lead 46 for the Q signal channel.

The I signal (or its complement without the added logical 1) on lead 44 is applied to a divide-by-two shift register 48, the output signal from which is applied to an AND gate 50. The signal on the lead 44 is also applied to an AND gate 52 and to a comparator 54.

The Q signal (or its complement without the added logical 1) on lead 46 is applied to the divide-by-two register 56, the output of which goes to an AND gate 58. The signal on the lead 46 is also applied to an AND gate 60 and to the comparator circuit 54.

Both divide-by-two circuits 48 and 56 are conveniently inexpensive shift registers which function in the same manner as described in connection with the divide-by-two circuits 22 and 32 in FIG. 1.

As in the case with the embodiment described in connection with FIG. 1, the respective AND gates 52 and 50 in the I signal channel are commanded by the output signal from the comparator circuit 54 to pass either the unshifted I signal or the shifted (I/2) signal to one set of input terminals of an adder 64 via an OR gate 62. The respective AND gates 58 and 60 in the Q signal channel are similarly commanded to pass either the shifted (Q/2) or the unshifted Q signal to the second set of input terminals of the added 64 via an OR gate 66.

The output signal from the adder 64 is thus similar to the output signal from the summing circuit 30 of the prior art circuit of FIG. 1 when the input initial digital signals have positive values. However, where either the I signal or the Q signal has a negative value, a difference exists between the result obtained in the circuit of FIG. 1 and the circuit of the invention employing EXCLUSIVE OR circuits.

This difference or error (with respect to the FIG. 1 circuit results) arises from the fact that if the sign bit of the initial input signal is negative, the magnitude bits as complemented in the EXCLUSIVE OR circuits yield a bias error of −⅛ which is comparable to the loss of a logical 1 in the least significant fractional bit channel F–3.

The resultant magnitudes of the I and Q signal channel digital signals on leads 44 and 46 are compared to compute the signal *I>Q*. This signal is a logical 0 if the absolute value of Q is greater than, or equal to, the absolute value of I. No comparator error occurs if both I and Q signal channel digital values are positive, as there is no bias present. Also, no comparator error occurs if both the I and the Q signal channel values are negative as they are both equally biased. If, however, the signs of the two values are different and if their absolute magnitudes are very nearly the same, there are two possible conditions which will give an erroneous answer relative to the result obtained in the prior art system because the logical 1 is not added to the complemented signal.

An erroneous answer will be obtained if the I signal is positive and the Q signal is negative and if their absolute values are equal, since in that case the comparator circuit 54 of FIG. 2 will indicate I to be greater than Q. If the I signal is negative and the Q signal is positive, and if the absolute magnitude of the I signal is one-eighth quanta (i.e., the sole difference being on input lead F–3) greater than the absolute magnitude of the Q signal, the output signal from the comparator 54 will indicate the I signal to be less than, or equal to, the Q signal.

The effect of these errors on the algorithm is small, but is considered as follows. The algorithm is implemented by detecting in the comparator 54 the signal *I>Q*. If the output signal from the comparator 54 is a logical 1, the magnitude of I is added to one-half the magnitude of Q, or to the magnitude of Q shifted by one bit to accomplish the division by two, as provided by the shift register 56. If the *I>Q* signal is a logical 0, the magnitude of I is divided by two in the divide-by-two circuit 48 and added to the magnitude of Q.

The fractional word that is divided by two or shifted when applied to the adder 64 will have a fourth fractional bit F–4 while the unshifted word will have only three fractional bits (i.e., the fourth bit F–4 would be 0).

At this point, a correction may be made for the errors which were introduced as a result of using the EXCLUSIVE OR circuits for complementing the bits of a negative initial digital signal without adding one to the least significant order. If the shifted digital signal was negative, adding a logical 1 to the fourth fractional bit F-4 reduces the bias error for that value from a —⅛ quanta to 0 since the least significant order in the EXCLUSIVE OR circuit F-3 is shifted to become the fourth fractional bit F-4.

If the unshifted magnitude was originally a negative number, adding a logical 1 to the "empty" fourth fractional bit F-4 terminal of the adder 64 reduces the bias error from a —⅛ quanta to —1/16 quanta for that word. Adding a logical 1 to the F-3 terminal of the adder 64 reduces the bias error from a —⅛ quanta to 0.

One logic circuit arrangement for making an approximate correction of the output signal from the adder 64 is illustrated in FIG. 2. The correction signal applied to the adder 64 may be applied on lead 68 from a logical OR circuit 70 which has as its input signals the inverted signal bits $\overline{S_I}$ and $\overline{S_Q}$. If the values of the initial signals are both positive, the inverted sign bits are both 0 and the OR gate 70 provides a logical 0 output signal. If the initial values are negative in either or both channels, a logical 1 signal condition will be applied to the OR circuit 70 which will provide the logical 1 on line 68 which is added to the adder 64 in the fourth fractional bit position F-4 to make the above-described correction.

Figure 3:
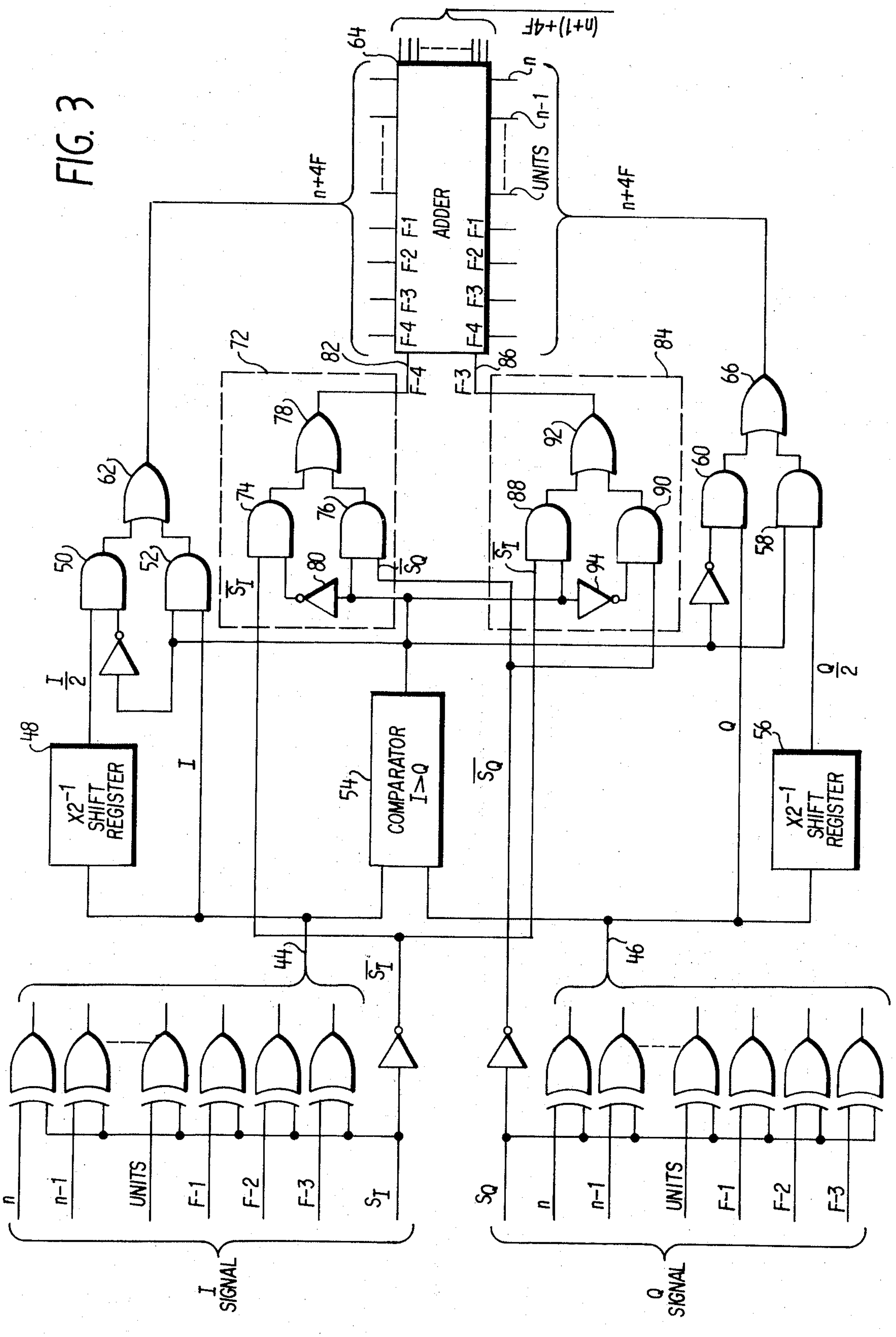

Another logic circuit arrangement for making an approximate correction of the output signal from the adder 64 of FIG. 2 is shown in FIG. 3. The OR gate 70 of FIG. 2 may be replaced by a logic circuit 72 comprising two AND gates 74 and 76, an OR gate 78 and an inverter 80. The output signal from the comparator 54 may be applied to one input terminal of the AND gate 76 and through the inverter 80 to one input terminal of the AND gate 74. The inverted sign signals $\overline{S_I}$ and $\overline{S_Q}$ may be applied to the other input terminals of the respective AND gates 74 and 76.

The output signals from the AND gates 74 and 76 may be applied through the OR gate 78, and the output signal from the OR gate 78 may be applied on lead 82 to the F-4 bit position of the adder 64. A correction will thus be applied to the F-4 bit position of the adder 64 on lead 82 whenever the shifted one of the binary input signals I and Q (i.e., the smaller signal) is negative.

A further correction may be made when the unshifted one of the signals I and Q is negative by providing a further logic circuit 84. The logic circuit 84 may generate a logical 1 output signal on lead 86 for application to the F-3 bit position of the adder 64 whenever the sign of the unshifted one of the signals I and Q is negative through the use of two AND gates 88 and 90, an OR gate 92 and an inverter 94.

The output signal from the comparator 54 may be applied to one input terminal of the AND gate 88 and through the inverter 94 to one input terminal of the AND gate 90. The inverted sign signal $\overline{S_I}$ may be applied to the AND gate 88 and the inverted sign signal $\overline{S_Q}$ may be applied to the AND gate 90. The output signals from the AND gates 88 and 90 may be supplied a correction signal on lead 86 via the OR gate 92.

By utilizing the circuit arrangements of FIGS. 2 and 3 as compared with the circuit of FIG. 1, it was possible to reduce the volume of the circuit and eliminate one component package by replacing the adder and subtractor stage with the logical EXCLUSIVE OR circuit bank. The power consumption was reduced by approximately 31 percent from 8,607 milliwatts to 5,970 milliwatts.

The costly adders ($56.38) were replaced by relatively inexpensive logical EXCLUSIVE OR devices ($6.70), providing a total savings of approximately 50 percent when taking into consideration the other changes made in the circuit. With the foregoing advantages, the question was raised as to how much accuracy was lost as a result of not having the first stage adder-subtractor. To determine the effect on accuracy of the substitution of the first adder-subtractor stages with EXCLUSIVE OR devices and the subsequent addition in the second adder stage, an error analysis was made in Fortran V on a Univac 1108 for the circuit of FIG. 3 employing as the correction circuit only the logic circuit 72. For a family of values of the quadrature Q channel, the inphase value I was allowed to vary through mini-values. The values were examined which allowed I and Q to range through + and − 10 whole quanta in steps of one-eighth quanta and over 25,000 vectors were examined.

The results clearly showed an improvement in accuracy. Of the 25,921 vectors examined, 12,718 gave improved accuracy; 13,041 gave equal accuracy; and 162 gave a loss in accuracy. The major loss in accuracy occurred when either the initial I signal or the Q signal was 0 and the other signal was negative. Another exception occurs when both components are negative one-eighth quanta.

In the past, it has seemed inconceivable to designers that the absence of the adder-subtractor for producing the 2's complement at the input would improve accuracy; but, surprisingly, the changes that were introduced as a result of these modifications to the circuit turned out to improve the accuracy and at the same time reduced the cost of the components, the power consumption, and the volume of the circuitry.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Apparatus for producing an output signal approximating the square root of the sum of the squares of two plural bit binary digital signals where the digital value of each of the two signals may have either a positive or negative sign comprising:
- a pair of signal channels each containing an initial plural bit binary digital signal and a sign signal;
- a first circuit means in each signal channel for producing a complement without adding a logical 1 in the least significant order for a digital signal having a negative sign for producing no change in the digital signal having a positive sign;
- means for generating a control signal determined by the comparative magnitudes of the values of the digital output signals from said first circuit means;

a summing circuit;

second circuit means including logical circuits responsive to said control signal for applying to the summing circuit a first digital signal having a value of one-half of the value of the output signal from said first circuit means that is the smaller and a second digital signal having the entire value of the output signal from the first circuit means that is the larger; and, a further circuit for applying to the summing circuit a logical 1 in the least significant fractional order in response to either initial digital signal being negative to produce an approximate square root of the sum of the squares of the initial digital signals.

2. Apparatus as claimed in claim 1 wherein said further circuit comprises a logical OR circuit having two input terminals and having its output terminal connected to the least significant fractional order in said summing circuit, and circuit means for applying the sign signal from each of said signal channels to the input terminals of said OR circuit.

3. Apparatus as claimed in claim 1 wherein said second circuit means comprises a pair of branch channels connected between the output of said first circuit means and the input to said summing circuit, with one of said branch channels in each pair including a divide-by-two circuit which shifts the plural bit binary digital signal by one order, and gating circuits operative in response to said control signal for selectively applying to said summing circuit the unshifted or the shifted digital signal output from said first circuit means.

4. Apparatus as claimed in claim 3 wherein said further circuit includes an OR circuit connected to the next to least significant fractional order in said summing circuit, and means responsive to a negative sign signal and said control signal for controlling the OR circuit to produce a logical 1 when the binary digital signal remains unshifted before being applied to the summing circuit and has a negative sign signal.

5. Apparatus as claimed in claim 1 wherein the first circuit means comprises an EXCLUSIVE OR logical circuit having two input terminals for each bit of the plural bit binary digital signal, means for applying the sign signal of the digital signal to one terminal of all of the EXCLUSIVE OR circuits, and means for applying the binary bit for each separate order of the plural bit binary digital signal to the other terminal of the respective EXCLUSIVE OR circuit.

6. Apparatus as claimed in claim 5 wherein said further circuit comprises a logical OR circuit having two input terminals and having its output terminal connected to the least significant fractional order in said summing circuit, and circuit means for applying the sign signal from each of said signal channels to input terminals of said OR circuit.

7. Apparatus as claimed in claim 5 wherein said second circuit means comprises a pair of branch channels connected between the output of said branch channels in each pair including a divide-by-two circuit which shifts the plural bit binary digital signal by one order, and gating circuits operative in response to said control signal for selectively applying to said summing circuit the unshifted or the shifted digital signal output from said first circuit means.

8. Apparatus as claimed in claim 7 wherein said further circuit comprises first and second logical OR circuits with the output terminal of the first OR circuit connected to the least significant fractional order in said summing circuit and the output terminal of the second OR circuit connected to the next to least significant fractional order in said summing circuit, and means responsive to a negative sign signal and said control signal for controlling the first OR circuit to produce a logical 1 when the binary digital signal that has been shifted before being applied to the summing circuit has a negative sign and for controlling the second OR circuit to produce a logical 1 when the binary digital signal remains unshifted before being applied to the summing circuit and has a negative sign signal.

9. A method for approximating the square root of the sum of two squares where the digital value of each may have either a positive or negative sign by:

providing a pair of initial plural bit binary digital signals each having a sign signal indicating a positive or negative value;

complementing each digital signal having a negative value without adding a logical 1 in the least significant order to convert such signals to positive value digital signals;

determining which of the pair of positive value digital signals has the largest value;

summing one half of the value of the smaller digital signal with the entire value of the larger digital signal to produce an approximate square root digital signal of the sum of the squares of the pair of initial digital signals; and, correcting the square root digital signal for any negative value of an initial digital signal by monitoring the sign signal of each of the initial digital signals, producing a logical 1 in response to either sign signal being negative and adding the logical 1 to the least significant order of the approximate square root digital signal to produce a corrected approximate square root digital signal.

10. The method as claimed in claim 9 wherein the initial plural bit binary digital signals are applied to a bank of EXCLUSIVE OR gates arranged to produce the 2's complement of each digital signal having a negative value without adding a logical 1 in the least significant order and for passing each digital signal having a positive value without change of value.

11. The method as claimed in claim 10 wherein the square root digital signal is corrected by adding a logical 1 to the least significant order of the approximate square root digital signal when the smaller digital signal has a negative sign signal and adding a logical 1 to the next to least significant order of the square root digital signal when the larger digital signal has a negative sign bit.

* * * * *